United States Patent [19]
Evans et al.

[11] Patent Number: 4,943,423
[45] Date of Patent: Jul. 24, 1990

[54] PROCESS FOR RECOVERING BORON TRIFLUORIDE FROM AN IMPURE GASEOUS BORON TRIFLUORIDE RESIDUE

[75] Inventors: Francis E. Evans, Hamburg, N.Y.; Kenneth H. Schroeder, Wilmington, Del.; William J. Wagner, Hamburg, N.Y.

[73] Assignee: Allied-Signal Inc., Morris Township, Morris County, N.J.

[21] Appl. No.: 277,153

[22] Filed: Nov. 29, 1988

[51] Int. Cl.$^5$ .................. C01B 35/06; C01B 17/90
[52] U.S. Cl. .................. 423/293; 423/531; 423/539
[58] Field of Search .................. 423/293, 522, 531

[56] References Cited

U.S. PATENT DOCUMENTS

| | | | |
|---|---|---|---|
| 2,416,133 | 6/1944 | Young | 23/205 |
| 2,697,027 | 12/1954 | Swinehart et al. | 423/293 |
| 3,246,949 | 4/1966 | Olstowski | 423/293 |
| 3,331,663 | 7/1967 | Linn et al. | 23/205 |
| 3,625,651 | 12/1971 | Massonne | 423/293 |
| 3,929,749 | 12/1975 | Cooper et al. | 260/86.7 |
| 4,265,871 | 5/1981 | Felice, Jr. et al. | 423/293 |
| 4,520,006 | 5/1985 | Laviron et al. | 423/293 |
| 4,781,909 | 11/1988 | Evans et al. | 423/293 |

FOREIGN PATENT DOCUMENTS

| | | | |
|---|---|---|---|
| 232560 | 3/1959 | Australia | 423/293 |
| 522875 | 3/1956 | Canada | 423/293 |
| 279438 | 8/1988 | European Pat. Off. | 423/293 |
| 1159911 | 11/1961 | Fed. Rep. of Germany | 423/293 |
| 2027389 | 12/1971 | Fed. Rep. of Germany | 423/293 |
| 59-50018 | 3/1984 | Japan | 423/293 |
| 01216065 | 12/1970 | United Kingdom | 423/293 |

Primary Examiner—Gary P. Straub
Attorney, Agent, or Firm—Melanie L. Brown; Jay P. Friedenson

[57] ABSTRACT

The present invention provides a process for recovering boron trifluoride from an impure gaseous boron trifluoride residue. The process comprises: (a) feeding an impure gaseous boron trifluoride residue containing sulfur dioxide as an impurity into a mixture of boric and sulfuric acids wherein the acid mixture absorbs boron trifluoride from the impure boron trifluoride residue and slightly absorbs or does not absorb sulfur dioxide from the impure gaseous boron trifluoride residue; and (b) removing the unabsorbed sulfur dioxide from the acid mixture.

The present invention also provides a boron trifluoride preparation and purification process. The process comprises the steps of (a) reacting boric acid and fluorosulfuric acid in surfuric acid to form a product; (b) distilling the product from step (a) to yield pure boron trifluoride and impure gaseous boron trifluoride; (c) feeding the impure gaseous boron trifluoride residue containing sulfur dioxide as an impurity into a mixture of boric and sulfuric acids wherein the acid mixture absorbs boron trifluoride from the impure gaseous boron trifluoride residue and only slightly absorbs sulfur dioxide from the impure gaseous boron trifluoride residue; and (d) removing the unabsorbed sulfur dioxide from the acid mixture.

The recovered boron trifluoride may be used as a catalyst.

8 Claims, No Drawings

PROCESS FOR RECOVERING BORON TRIFLUORIDE FROM AN IMPURE GASEOUS BORON TRIFLUORIDE RESIDUE

BACKGROUND OF THE INVENTION

The present invention relates to a process for recovering boron trifluoride from an impure boron trifluoride residue, and more particularly, to a process for separating boron trifluoride from an impure boron trifluoride residue having sulfur dioxide therein.

As taught by commonly assigned U.S. Pat. No. 2,416,133, boron trifluoride (hereinafter $BF_3$) is conveniently manufactured by the reaction of boric acid (hereinafter $H_3BO_3$) with fluorosulfuric acid (hereinafter $FSO_3H$) by using sulfuric acid (hereinafter $H_2SO_4$) as the reaction medium.

$$H_3BO_3 + 3FSO_3H \rightarrow BF_3 + 3H_2SO_4$$

Fluorosulfuric acid is also known as fluorosulfonic or fluosulfonic acid.

$BF_3$ may also be prepared by the reaction of $H_3BO_3$ with hydrogen fluoride (hereinafter HF) followed by dehydration of the subsequently formed $BF_3 \cdot$hydrate with oleum.

$$H_3BO_3 + 3HF \rightarrow BF_3 \cdot H_2O + 2H_2O$$

$$BF_3 \cdot H_2O + 2H_2O + Oleum(H_2SO_4 + SO_3) \rightarrow BF_3 + H_2SO_4$$

The foregoing reactions are followed by a distillation to separate pure $BF_3$ from the impure $BF_3$ residue.

$BF_3$ is a Lewis acid or electron acceptor and is used primarily as an acidic catalyst for such reactions as polymerization, esterification, and alkylation. More specifically, $BF_3$ is a useful catalyst for the polymerization of olefins, vinyl ethers or esters, heterocyclic unsaturated organic compounds, unsaturated acids or esters, and terpenes or derivatives thereof.

Although the aforementioned pure $BF_3$ is useful in the foregoing applications, the impure $BF_3$ residue is typically unacceptable because the level of impurities present is high. Regardless of the preparation method of $BF_3$, the raw materials, i.e. $FSO_3H$, $H_2SO_4$, oleum, and HF, used in $BF_3$ preparation contain impurities which become part of the crude $BF_3$ product stream. The impurity level must be reduced prior to the sale of $BF_3$ because impurities such as sulfur trioxide (hereinafter $SO_3$) and sulfur dioxide (hereinafter $SO_2$) may react detrimentally in customer processes. For example, $SO_2$ and $SO_3$ may cause undesirable colored products while $SO_2$ may also create a poisoned catalyst. In addition to $SO_2$ and $SO_3$, other impurities which may be present in very low concentrations include arsenic fluoride (hereinafter $AsF_5$), antimony fluoride (hereinafter $SbF_3$), and silicon fluoride (hereinafter $SiF_4$). An analysis of a typical impure $BF_3$ waste side steam or residue by weight is as follows: about 40 to about 95% $BF_3$, about 5 to about 30% $SO_2$, about 0 to about 19% $SO_3$, about 0 to about 0.2% $SiF_4$, about 0 to about 1.0% $AsF_5$, and about 0 to about 0.1% $SbF_3$.

In the industry, the sales specifications for typical quality $BF_3$ require $SO_3$ levels of about 0.05 to 0.001%. The $SO_3$ typically reacts with moisture present in the system, and therefore, is seldom a problem. In the industry, the limits for $SiF_4$ are about 0.03%. No industry specifications exist for the other impurities, and indeed, they are generally below accepted detection levels. $SO_2$ is the most difficult impurity to remove from an impure $BF_3$ residue. In the industry, the sales specifications for typical quality $BF_3$ require $SO_2$ levels of about 0.1 to 0.002%.

As such, purification of such an impure $BF_3$ waste side stream or residue is necessary if the $BF_3$ is to be isolated as a useful product. Since about 1952, the commercial practice has been to convert the impure $BF_3$ residue by reaction with diethyl ether to form an impure $BF_3$-diethyl ether complex. This complex is then purified and used in the production of leaded gasoline and as a liquid source of $BF_3$ for catalyzing various other reactions. Because the market for leaded gasoline has dropped sharply, this method of using the impure $BF_3$ residue is no longer as commercially appealing. If the impure $BF_3$ residue is sent to waste disposal rather than purified, the process yields are reduced and the process costs are increased due to the cost of waste treatment.

$BF_3$ and $SO_2$ are very soluble in water but $BF_3 \cdot$hydrate is difficult to decompose without destroying the $BF_3$. $BF_3$ and $SO_2$ are also known as mentioned earlier, is a solvent used in the manufacture of $BF_3$. It is also known that $BF_3$ may be absorbed by many complexing agents which do not absorb $SO_2$ but it is difficult to decompose such a complex in order to recover the $BF_3$.

Commonly assigned U.S. Pat. No. 4,265,871 deals with the purification of the waste $H_2SO_4$ which results from a $BF_3$ preparation process. In the first step of the process, the contaminated $H_2SO_4$ is contacted with an inert gas to remove $BF_3$ from the $H_2SO_4$. In the second step, the $BF_3$ rich gas is passed through an absorbing mixture of boric and sulfuric acids so that the $BF_3$ is recovered from the inert gas; the reference does not teach that $SO_2$ is present in the waste $H_2SO_4$ treated or address the problem which is solved by the present process.

Any method for recovering $BF_3$ from an impure gas stream must permit recovery for either storage as product or else for recycling to process for subsequent recovery as a saleable product. It would be convenient to be able to purify an impure $BF_3$ stream by destroying $SO_2$ so as to free $BF_3$ from its major contaminant; alternatively, it would be convenient to absorb $SO_2$ or $BF_3$ so as to leave a relatively pure stream of $BF_3$ for recovery or a stream of $SO_2$ for sending to waste treatment.

As such, the industry needs a simple means for processing an impure boron trifluoride residue wherein a commercially useful product is generated and waste disposal problems of current processes are avoided.

SUMMARY OF THE INVENTION

The present invention is an efficient and economical process which provides for the recovery of a valuable product from a waste side stream. More specifically, the present invention provides a process for recovering boron trifluoride from an impure boron trifluoride residue. The process comprises the steps of: (a) feeding an impure gaseous boron trifluoride residue containing sulfur dioxide as an impurity into a mixture of boric and sulfuric acids wherein the acid mixture absorbs boron trifluoride from the impure gaseous boron trifluoride residue and only slightly absorbs sulfur dioxide from the impure gaseous boron trifluoride residue; and (b) removing the unabsorbed sulfur dioxide from the acid mixture.

Unexpectedly, it was found that the solubility of $SO_2$ in a mixture of boric and sulfuric acids was much less than for SO$_2$ in sulfuric acid alone even considering the lower amount of sulfuric acid present. For example, in 100% H$_2$SO$_4$, the SO$_2$ solubility at 100° C. is about 1.0%. By calculation in a 25% boric acid/75% sulfuric acid mix, the SO$_2$ solubility should be about 0.75%; surprisingly, the SO$_2$ solubility was actually only about 0.30%. Thus, the mixture of boric and sulfuric acids does not absorb or only slightly absorbs sulfur dioxide. The phrase "the acid mixture only slightly absorbs sulfur dioxide" as used herein means that the acid mixture absorbs less than about 0.3% by weight sulfur dioxide.

Compared to the current method of converting the impure BF$_3$ residue to a complex, the present process is advantageous because the process produces BF$_3$ which is a highly saleable product compared to BF$_3$-diethyl ether which is a produce in low demand and also avoids the problems and expense associated with the disposal of impure BF$_3$-diethyl ether.

As such, the present invention fulfills the need in the art for a simple means for processing impure BF$_3$ residue wherein a commercially useful product is generated and waste disposal problems of current processes are minimized or eliminated.

In another embodiment, the present invention provides a boron trifluoride preparation and purification process. The process comprising the steps of: (a) reacting boric acid and fluorosulfuric acid in sulfuric acid to form a product; (b) distilling the product from step (a) to yield pure boron trifluoride and impure gaseous boron trifluoride residue; (c) feeding the impure gaseous boron trifluoride residue containing sulfur dioxide as an impurity into a mixture of boric and sulfuric acids wherein the acid mixture absorbs boron trifluoride from the impure gaseous boron trifluoride residue and only slightly absorbs sulfur dioxide from the impure gaseous boron trifluoride residue; and (d) removing the unabsorbed sulfur dioxide from the acid mixture.

As a result of this embodiment the overall yield of BF$_3$ is increased in addition to the foregoing advantages.

Other advantages of the present invention will become apparent from the following description and appended claims.

DETAILED DESCRIPTION OF THE PREFERRED EMBODIMENT

The present process is directed to the purification of impure gaseous boron trifluoride residue. The present process is useful in the purification of the impure gaseous boron trifluoride residue which results from most known boron trifluoride preparation processes.

Although the boron trifluoride may be manufactured by any known process, preferably, the boron trifluoride is manufactured in a reaction vessel by the reaction of H$_3$BO$_3$ with FSO$_3$H by using H$_2$SO$_4$ as the reaction medium as taught by commonly assigned U.S. Pat. No. 2,416,133. Commercially available H$_3$BO$_3$, FSO$_3$H, and H$_2$SO$_4$ may be used in the BF$_3$ preparation. The H$_2$SO$_4$ and any impurities soluble therein are fed out of the BF$_3$ preparation vessel and are preferably recycled. The boron trifluoride component is fed out of the BF$_3$ preparation vessel into a distillation apparatus. A distillation separates the pure boron trifluoride from the impure boron trifluoride residue. The pure boron trifluoride is fed out of the distillation apparatus while the impure boron trifluoride residue is fed out of the distillation apparatus into a purification apparatus. Preferably, the impure boron trifluoride residue comprises by weight: about 70 to about 95% BF$_3$ and about 5 to about 30% SO$_2$.

As mentioned earlier, the impurity level in the boron trifluoride residue must be reduced prior to the sale of the boron trifluoride because the impurities may react detrimentally in the customers' end uses. The main purpose of the present process is to separate boron trifluoride from SO$_2$. In commonly assigned U.S. Pat. 4,265,871,, it was discovered previously that the absorption of boron trifluoride into absorbing sulfuric acid was improved when the sulfuric acid contained boric acid. Unexpectedly in the present process, it was discovered that the solubility of SO$_2$ in a mixture of boric and sulfuric acids was much less than for SO$_2$ in sulfuric acid alone even when considering the lower amount of sulfuric acid present. In 100% H$_2$SO$_4$, the SO$_2$ solubility at 100% is about 1.0%. By calculation the SO$_2$ solubility in a 25% boric acid/75% sulfuric acid mixture should be about 0.75%; surprisingly, the actual SO$_2$ solubility was about 0.30%. As such, by using a mixture of boric and sulfuric acids to separate boron trifluoride from sulfur dioxide, the present process yields boron trifluoride having a sulfur dioxide level which meets industry standards.

A mixture of boric and sulfuric acids is fed into the purification apparatus while the impure boron trifluoride gas stream is fed into the purification apparatus. In a typical operation about 4800 to about 5000 lbs. (10,667 to 11,111 kg) of a mixture of boric and sulfuric acids may be used. The acid mixture absorbs the boron trifluoride and the acid mixture only slightly absorbs or does not absorb the sulfur dioxide. Commercially available boric and sulfuric acids may be used for this absorbing step. Generally, the amount of boric acid is about 1% by weight up to the maximum amount of boric acid which is soluble in the sulfuric acid at the purification apparatus operating temperature. Preferably, the acid mixture comprises by weight about 1 to about 30% boric acid and about 70 to about 99% sulfuric acid. More preferably, the acid mixture comprises by weight about 20 to about 30% boric acid and about 70 to about 80% sulfuric acid.

Generally, the operating temperature of the purification apparatus is about ambient to about 100° C. Typically, the operating temperature of the purification apparatus is about 16° to about 100° C. More preferably, the operating temperature of the purification apparatus is about 50° to about 100° C. More preferably, the operating temperature of the purification apparatus is about 90° to about 100° C.

Purification apparatus suitable for the absorbing step include a packed and/or tray absorbing tower. The relative flow rates of the impure boron trifluoride residue and the mixture of boric and sulfuric acids depending upon the apparatus chosen, concentration of boron trifluoride, composition of the acid mixture, and the temperature and the pressure, are easily determined within broad ranges by routine testing and measurement. Preferably the sulfur dioxide in the boron trifluoride residue is reduced to below about 4% by weight, more preferably below about 2% by weight and most preferably below about 1% by weight. Typically, the contact time is about 5 to about 30 seconds. Because maximum acceptable sulfur dioxide levels vary depending upon the conditions and upon controlling environmental regulations and laws, the absorbing step is preferably conducted in a manner that will, at a minimum, achieve these necessary limits.

After the boron trifluoride and sulfur dioxide have been separated the acid mixture containing the absorbed boron trifluoride is withdrawn. Preferably, the acid mixture containing the absorbed boron trifluoride is recycled back to the reaction vessel for use in the preparation of further boron trifluoride. The separated sulfur dioxide stream is withdrawn from the purification apparatus. The exiting $SO_2$ stream containing only traces of boron trifluoride may be absorbed in water or any other convenient medium and recovered as sulfite liquor for use elsewhere or sent to waste treatment for disposal in the normal manner.

In operation, no evidence of sulfur dioxide buildup occurs which indicates that the sulfur dioxide solubility is suppressed by the presence of boric acid or boron trifluoride. The exiting sulfur dioxide stream containing only traces of boron trifluoride need only be vented once per eight hour shift in order to maintain acceptable sulfur dioxide levels in the final product. When this stream is recycled to the distillation apparatus, venting is still only required once per eight hour shift despite the potential for increased sulfur dioxide buildup in the system. As a result of recycling, the overall product yield is increased.

The present invention is more fully illustrated by the following non-limiting Examples.

EXAMPLE 1

In the laboratory, a boric acid/sulfuric acid (25/75 weight percent) mix (436.5 g) was charged to a suitable flask and a $BF_3/SO_2$ mix containing 25% of $SO_2$ was passed through the solution at 97–100° C. until 50 grams of the gas mix (37.2 g $BF_3$, 12.8 g $SO_2$) had been introduced. The boric/sulfuric mix was found to contain 0.3% $SO_2$. The total weight gain of the boric/sulfuric mix was 39.5 g compared with a theoretical of 37.2g for $BF_3$ and 1.4 g for $SO_2$ for an expected gain of 38.6g. Only traces of $BF_3$ were found in the exit gases. The exit gases comprised more than 90% $SO_2$.

EXAMPLE 2

Boric acid was reacted with fluorosulfuric acid to prepare $BF_3$ according to U.S. Pat. No. 2,416,133. During normal plant operations, approximately 150 lbs. (333 kg) of an impure process $BF_3$ stream (91–93% $BF_3$, 5–7% $SO_2$, and 0–3% $SO_3$) were removed from the process per working shift. The plant was readapted to recycle the impure $BF_3$ back to a scrubber containing the boric/sulfuric mix (25/75 weight percent) used for the manufacture of $BF_3$. This impure $BF_3$ stream containing $SO_2$ and $SO_3$ was recycled to the process for more than three months (over 150 cycles) with no observed change in operating conditions and no change in schedule for the removal of the impure side stream. It was thus clearly shown that no significant $SO_2$ was recycled to process. Moreover, no evidence of significant amounts of $BF_3$ in the exit gas from the boric/sulfuric scrubber existed.

Having described the invention in detail and by reference to preferred embodiments thereof, it will be apparent that modifications and variations are possible without departing from the scope of the invention defined in the appended claims.

What is claimed is:

1. A method for removing sulfur dioxide from a boron trifluoride stream comprising the steps of:
   (a) condensing a gaseous boron trifluoride stream;
   (b) distilling said condensed boron trifluoride stream to yield pure boron trifluoride and a liquid boron trifluoride residue wherein said liquid boron trifluoride residue comprises by weight: about 40 to about 95% boron trifluoride, about 5 to about 30% sulfur dioxide, about 0 to 19% sulfur trioxide, about 0 to about 0.2% silicon fluoride, about 0 to about 1.0% arsenic fluoride, and about 0 to about 0.1% antimony fluoride;
   (c) vaporizing said liquid boron trifluoride residue;
   (d) feeding said gaseous boron trifluoride residue into a mixture of boric and sulfuric acids wherein said acid mixture comprises by weight about 1 to about 30% boric acid and about 70 to about 99% sulfuric acid and absorbs boron trifluoride from said gaseous boron trifluoride residue and only slightly absorbs sulfur dioxide from said gaseous boron trifluoride residue; and
   (e) removing said unabsorbed sulfur dioxide from said acid mixture.

2. The method of claim 1 wherein said gaseous boron trifluoride stream is formed by the step of: reacting boric acid and fluorosulfuric acid in sulfuric acid.

3. The method of claim 2 wherein after said step (e), said acid mixture having absorbed boron trifluoride therein is recycled to said gaseous boron trifluoride stream preparation step.

4. The method of claim 1 wherein said step (d) is conducted at a temperature of about 16° to about 100° C.

5. The method of claim 1 wherein said step (d) is conducted at a temperature of about 50° to about 100° C.

6. The method of claim 1 wherein said step (d) is conducted at a temperature of about 90° to about 100° C.

7. The method of claim 1 wherein said acid mixture comprises by weight about 20 to about 30 percent boric acid and about 70 to about 80 percent sulfuric acid.

8. The method of claim 1 wherein said liquid boron trifluoride residue comprises by weight about 70 to about 95 percent boron trifluoride and about 5 to about 30 percent sulfur dioxide.

* * * * *